REDUNDANT SIGNAL AMPLIFIER TRANSMISSION CHANNEL

Filed June 29, 1962

INVENTORS:
RANDOLPH C. EARLY,
ALLEN J. FULLER,
BY J. David Blumenfeld
THEIR ATTORNEY.

United States Patent Office 3,223,940
Patented Dec. 14, 1965

3,223,940

REDUNDANT SIGNAL AMPLIFIER TRANSMISSION CHANNEL

Randolph Carlton Early and Allen Jefferson Fuller, Lynchburg, Va., assignors to General Electric Company, a corporation of New York Filed June 29, 1962, Ser. No. 206,374
3 Claims. (Cl. 330—84)

Figure 1:
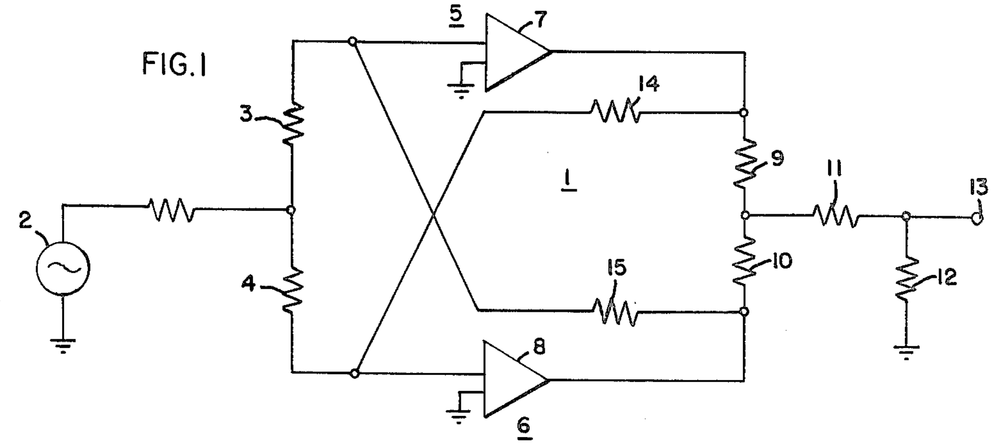

This invention relates to a highly reliable signal transmission channel in a communication system. More particularly, it relates to a transmission channel which is characterized by the fact that failure of any active component, such as an amplifier, for example, does not interrupt or degrade transmission of the signal through the channel.

Circuit and system reliability is a continuing and difficult problem in the communication industry. The reliability problem is found in one of its most aggravated forms in multichannel or multiplex transmission systems since failure of an active circuit component, such as an amplifier, at any stage and in any one of the numerous signal transmission channels of the system can disrupt signal transmission and the operation of a large portion of the whole system. In order to avoid such costly and annoying interruptions of service, it has been customary to provide continually energized "stand-by" equipment which is switched into the system whenever such a component failture occurs. The wastefulness inherent in having to duplicate all circuits to protect against possible failure of but a single component is immediately evident, particularly when it is considered that the stand-by equipment, although continuously energized, contributes nothing towards signal transmission under normal circumstances.

However, even if the additional cost and space requirements of stand-by equipment are not deterrents, such equipment by no means insures absolute reliability. There is always the risk that the switching equipment itself may fail. Furthermore, stand-by equipment merely prevents long-term interruption of transmission. There is an inevitable temporary interruption of signal transmission since the switching relays require a finite period of time to connect the stand-by equipment into the system. Moreover, this temporary interruption is always accompanied by a further interval of signal degradation in that the signal is severely attenuated for a period of time after switching has occurred. It is clear, therefore, that providing stand-by equipment to cope with the reliability problem has many and very substantial drawbacks.

It is a primary object of this invention, therefore, to provide a transmission channel for use in communication systems which is highly reliable and in which transmission of the intelligence or information is not interrupted or degraded by failure of any circuit component;

Another object of this invention is to provide a signal transmission channel in which the failure of an active element or any of its associated components does not affect the output signal level or the general operational characteristics of the channel;

Still another object of this invention is to provide a signal transmission channel which is highly reliable, simple in construction, and inexpensive to manufacture;

A still further object of this invention is to provide a signal transmission path which automatically compensates for changing in the parameters of the active components due to aging or other changes and thereby maintains the output signal level and general operational characteristics of the channel substantially constant;

Yet another object of this invention is to provide a signal transmission channel which includes two interconnected redundant amplifying paths so that failure of one component amplifier does not deleteriously affect the output signal level;

Other objects and advantages of this invention will become apparent as the description thereof proceeds.

In accordance with the invention, the foregoing objects are accomplished by providing a signal transmission channel in which the incoming signal is split into separate components and transmitted over separate amplifying paths. The individual amplified signal components are recombined at the output of these paths and applied to the load or utilization circuit. The individual amplifying paths are interconnected to form a redundant structure so that malfunctioning or deterioration of an active element in one path increases the gain of the remaining path to compensate for the signal loss thereby maintaining the output signal level and the operational characteristics substantially constant. Each active component in the transmission channel is thus provided with a continuously active parallel element thereby greatly enhancing the system reliability.

Figure 2:
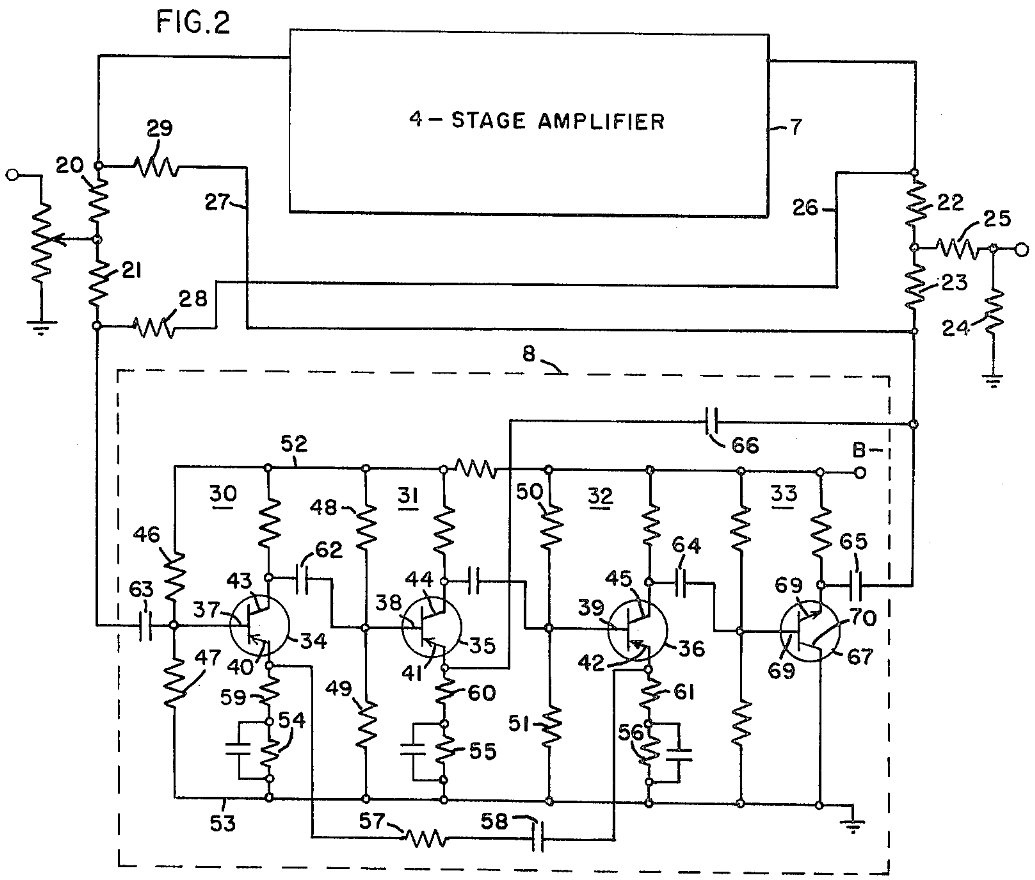

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a diagrammatic illustration of a transmission channel constructed in accordance with the invention; and FIG. 2 is a circuit diagram of one embodiment of the invention.

One form of the transmission channel embodying the instant invention is illustrated diagrammatically, and by way of example, in FIG. 1 of the accompanying drawings. Electrical signals in the form of amplitude, frequency, phase or pulse modulated voltages, are provided from any suitable source which is represented symbolically by the generator 2. These signals applied to transmission channel 1 are impressed between the junction of input isolating resistances 3 and 4, and a point of reference potential, such as ground. The signal source need not, of course, be limited to an oscillator or similar generating device, but may be the preceding stage of the transmission system or an incoming signal from a receiver antenna, etc. In other words, the transmission channel about to be described may be utilized in any one of many locations in a communication system.

The transmission channel includes two transmission paths over which the incoming signal is simultaneously transmitted. The incoming signal is translated into two equal, in-phase signal components which are transmitted over individual amplifying paths 5 and 6 which together form the transmission channel 1. These signal components are amplified by suitable amplifying means 7 and 8 included in the amplifying paths 5 and 6 and are connected through output isolating resistances 9 and 10 and impedance matching resistance 11 to an output load illustrated schematically by means of the resistance 12. The amplified output signals appearing across resistances 9 and 10 are added algebraically to produce the desired amplified output signal across the load element 12.

Amplifying paths 5 and 6 are interconnected to maintain the output signal amplitude and the general transmission channel characteristics substantially constant in event of any malfunction or deterioration in either of the amplifiers in paths 5 and 6. To this end, the output of amplifier 7 is coupled to the input of amplifier 8 through negative feedback path 14 and the output of amplifier 8 is coupled to the input of amplifier 7 through negative feedback path 15. The feedback paths 14 and 15 provide a suitable negative feedback loop between the output of one amplifier and the input of the corresponding amplifier in the other signal transmission path to insure proper load sharing between the amplifiers so that failure or deterioration of either amplifier does not change the output level of the signal carried across load resistor 12. The manner in which this circuit performs this load sharing function in order to maintain the output constant may best be understood by considering the following:

With both amplifier circuits operating properly, an incoming signal is applied to the two amplifying paths 5 and 6 as two equal, in-phase signal components. Both amplifiers also have a 6 db negative feedback signal applied to their inputs and as a result, under normal conditions, the output of the individual amplifiers is approximately equal and these outputs are combined and applied to the output resistor 12. In the event that amplifier 7 fails, as might be the case, for example, if there were an open or short circuit in its input, output, or internal connections; or by failure of the power supply, the output of amplifier 7 goes to zero which would tend to reduce the output voltage across resistor 12 to one-half of its value. However, failure of amplifier 7 automatically reduces the negative feedback signal impressed on the input of amplifier 8, increasing the gain of the amplifier and the output signal in the associated amplifying path by an equal amount thereby maintaining the output voltage across the output of resistance 12 substantially constant. Similarly, if amplifier 8 in path 6 fails, the negative feedback voltage applied to feedback loop 15 to the input of amplifier 7 is removed causing amplifier 7 to increase its output voltage by an equivalent amount and maintaining the output voltage constant.

The utility of the instant invention is, of course, not limited to a situation in which there is a complete failure of one of the amplifying paths. Cross-coupling of the negative feedback paths, as illustrated in FIG. 1, also compensates for the slow changes in the operational characteristics in any one of the amplifying paths by changing the load sharing ratio of the paths. Thus, for example, if the output of one amplifying path were to vary due to a slow deterioration of one of its elements, such as might be caused by aging of an amplifying element, variations in the power supply, etc., the feedback signal level applied to the other amplifier changes sufficiently in direction and magnitude so that the gain of the other amplifier is suitably varied to maintain the output across load resistance 12 constant. It is thus apparent that the novel signal transmission channel illustrated in FIG. 1 greatly enhances system reliability not only by protecting against an out-and-out failure of one of the amplifying paths but by continuously correcting for deterioration in the operational characteristics of one of the components in the amplifying paths.

In addition to the high degree of operational reliability which characterizes this circuit arrangement, both in terms of guarding against the complete failure of a circuit element or device and against the slow deterioration of these same elements, the circuit also provides certain vary important advantages in terms of cost and ease of manufacturing. That is, since the circuit continuously compensates for changes in and deterioration of components and devices in the individual amplifying paths by adjusting the feedback signals and the gain characteristics, there is no need for using carefully matched components since the circuit automatically adjusts for any differences thus introduced. This, of course, is very advantageous from the cost and fabrication standpoint.

It will also be appreciated that one of the incidental advantages of the circuit arrangement illustrated in FIGS. 1 and 2 is that the signal transmission channels have substantially no bandwidth limitations. That is, by utilizing resistance input and output coupling and isolating elements rather than hybrid transformers or the like, the bandwidth limitations inherent in transformer devices are avoided.

An alternative embodiment of a signal transmission channel constructed in accordance with the principles of the invention and utilizing a four-stage transistorized amplifier circuit is illustrated in FIG. 2. The input signal is again impressed between the junction of two input isolating resistances 20 and 21 and a point of reference potential such as ground. Isolating resistances 20 and 21 are respectively connected to the input circuits of amplifiers 7 and 8 which are incorporated in the individual amplifying paths making up the transmission channel. As described previously with reference to FIG. 1, the incoming signal is applied to the individual transmission paths as two equal and in-phase signal components which are amplified and then recombined at the output of the amplifiers by means of a pair of output isolating resistances 22 and 23 coupled to load 24 through impedance matching resistance 25.

Negative feedback between the output of amplifier 7 and the input of amplifier 8 and between the output of amplifier 8 and the input of amplifier 7 is provided by the two feedback loops 26 and 27. Feedback loop 27 includes a voltage dropping resistance 29 and is connected between the lower end of output isolating resistance 23 and the upper end of input isolating resistance 20. Similarly, negative feedback loop 26 establishes a feedback path from the output of amplifier 7 at the upper end of output isolating resistance 22 and the input of amplifier 8 through dropping resistance 28 connected to the lower end of input isolating resistance 21 As described previously, these feedback networks impress a negative feedback voltage on the inputs of the respective amplifiers so that any failure or deterioration of one of the amplifiers results in a reduction of the negative feedback to the other amplifier causing that amplifier to increase its gain and carry a greater portion of the transmission channel load thereby maintaining the output signal substantially constant.

The amplifier 7 and 8, only one of which is shown in detail since they are identical in construction and operation, are four-stage cascaded transistor amplifiers. Four-stage transistor amplifier 8 has three common-emitter stages 30, 31 and 32 followed by a common collector, or "emitter-follower" stage 33. The common-emitter amplifier stages 30, 31 and 32 include PNP transistors 34, 35 and 36, having base electrodes 37, 38 and 39, emitter electrodes 40, 41 and 42, and collector electrodes 43, 44 and 45. Biasing for each of the common emitter stages is provided in part by the voltage dividing networks 46–47, 48–49, and 50–51, connected between a negative bus 52 and the grounded bus 53. The bases of transistors 34, 35 and 36 are connected to the junction of the voltage dividing resistances, thereby establishing, at least in part, the transistor biasing conditions. In addition, feedback or "self" biasing for the transistors is provided by the emitter resistances 54, 55 and 56, each of which is bypassed for A.C. by suitable capacitors and the unbypassed emitter resistances 59, 60 and 61.

Internal negative feedback for stabilizing the gain and linearity of the amplifier is provided between the emitters of transistors 36 and 34 by the series R-C network 57 and 58. Negative feedback at the individual stages is also provided by means of the unbypassed emitter resistances 59, 60 and 61 connected in the emitter circuit of the individual amplifier stages. Positive feedback for stabilizing the frequency response of the amplifier and for suppressing parasitic oscillations is also provided between the output of the amplifier and the emitter of transistor stage 31 through coupling capacitor 66 connected in the feedback loop from the lower end of output isolating resistance 23 and emitter 41 of transistor 35.

The input signal component is impressed on the first amplifier stage 30 through the input isolating resistance 21 and coupling capacitor 63 which is connected to base 37 of PNP transistor 34. The output from the first stage is applied through a coupling capacitor 62 to base 38 of the succeeding stage, and then from the collector 44 of transistor 35 to the base 39 of transistor 36. The output from amplifier stage 32 is coupled through a coupling capacitor 64 to base electrode 68 of emitter-follower 33 and from the emitter through a coupling capacitor 65 to the output isolating resistance 23.

Output emitter-follower 33 consists of an NPN transistor having a base 68, an emitter 69 and a collector 70. Collector 70 is connected directly to grounded bus 53 and emitter 69 to negative bus 52 through an unbypassed resistor 71. Biasing for emitter-follower 33 is provided by voltage dividing network 72–73 and unbypassed emitter resistor 71. Emitter-follower 33 provides impedance matching between the output load 24 and the amplifier 8. That is, an emitter-follower such as shown at 33 is characterized by a very high input impedance and a very low output impedance and is customarily used when working between a high impedance source and a low impedance load.

It will be appreciated, however, that the particular amplifier circuit illustrated in FIG. 2 is by way of example only and that the instant invention will function just as effectively with any other type of phase reversing amplifier configuration.

In order to determine the ability of the transmission channel arrangement to maintain the output signal of the channel substantially constant in spite of malfunctions in one of the amplifying paths, the circuit as illustrated in FIG. 2 was deliberately caused to malfunction, by both placing A.C. short circuits at each of the stages of each amplifier section, by producing open circuits at corresponding locations, and by removing the supply voltage from one of the amplifiers. The gain of the transmission channel was then measured in a range of frequencies from 300 cycles to 2 megacycles. The transmission channel was then adjusted to have a normal gain of 16 db in the absence of any malfunction. The following tabulation represents the changes in amplifier gain (in db) at various frequencies in the range from 300 cycles to 2 megacycles.

CHANGES IN GAIN (DB)

| Frequency in c.p.s. | Input to One Amplifier Shorted | Output of One Amplifier Shorted | Supply Voltage Removed | Worst Condition for Any Transistor Amplifier Opened or Shorted |
|---|---|---|---|---|
| 300 | −.03 | +.01 | −.01 | +.02 |
| 3,000 | −.03 | +.01 | −.01 | +.02 |
| 30,000 | −.03 | +.01 | −.01 | +.04 |
| 300,000 | −.04 | .00 | −.01 | −.06 |
| 1,000,000 | −.08 | −.07 | −.01 | −.14 |
| 2,000,000 | −.29 | −.27 | −.01 | −.29 |

It is evident from these tabulated results that the output signal of the transmission channel remains substantially constant under various conditions of malfunction. That is, there is neither an interruption of transmission nor any significant deterioration in transmission by malfunctioning components at various stages of the individual paths. This arrangement, therefore, provides a high degree of reliability by means of a relatively simple and uncomplicated circuit arrangement.

While a number of embodiments of this invention have been shown, it will, of course, be understood that it is not limited thereto, since many modifications both in the circuit arrangement and in the instrumentalities employed may be made. It is contemplated by the appended claims to cover any such modifications as fall within the true spirit and scope of the invention.

What is claimed as new and desired to be secured by Letters Patent is:

1. in a redundant signal transmission channel, the combination comprising a signal transmission path having an input and an output, a further signal transmission path having an input and an output, common input means for said paths having an input signal impressed thereon, means for splitting said input signal into two in-phase components the sum of which is equal to said input signal, said signal components being individually and simultaneously transmitted over said paths, said paths each including an active device which controls the amplitude response of said path, common output summing means coupled to the output of said paths for serially recombining the signal the magnitude of which is the sum of the transmitted components, and means for coupling the output of one of the said active devices to the input of the remaining device and the output of the remaining device to the input of said one device to control continuously the transmission characteristics of each path in response to the signal level in the other path whereby failure or deterioration of signal transmission in one of said paths does not affect the amplitude of the recombined signal.

2. In a redundant signal transmission channel, the combination comprising a first signal transmission path having an input and an output and including signal amplifying means, a second signal transmission path having an input and an output and including signal amplifying means, common input means for said paths having an input signal impressed thereon, means for splitting said input signal into substantially equal in-phase components the sum of which is equal to said input signal, said signal components being individually and simultaneously transmitted over said paths and amplified therein, common output summing means coupled to the output of said paths for serially recombining the amplified signal components to produce an amplified output signal the magnitude of which is the sum of the amplified components, and feedback means coupling the output of the amplifying means in said first path to the input of the amplifying means of said second path, and the output of the amplifying means in said second path to the input of the amplifying means in said first path for controlling the gain of the individual amplifying means in response to the changes in signal level in the other paths.

3. The signal transmission channel according to claim 2 wherein a negative feedback loop is established between the outputs of the amplifying means in each path and the inputs of the amplifying means in the other path whereby a failure in one path reduces the negative feedback applied to the other path thereby increasing the signal level in the other path sufficiently to maintain the output signal level substantially constant.

References Cited by the Examiner

UNITED STATES PATENTS 2,771,518 11/1956 Sziklai ---------------- 330—84
2,775,657 12/1956 Van Zelst ------------ 330—84

FOREIGN PATENTS 1,078,620 3/1960 Germany.

ROY LAKE, *Primary Examiner.*